MAGNETIC STORAGE AND SWITCHING SYSTEM

Filed Oct. 31, 1961 3 Sheets-Sheet 1

INVENTORS
NORBERT G. VOGL, JR.
JOHN A. PARISI
BY [signature]
ATTORNEY 3,271,749
United States Patent Office
Patented Sept. 6, 1966

3,271,749

MAGNETIC STORAGE AND SWITCHING SYSTEM

Norbert G. Vogl, Jr., and John A. Parisi, both of Wappingers Falls, N.Y., assignors to International Business Machines Corporation, New York, N.Y., a corporation of New York Filed Oct. 31, 1961, Ser. No. 149,050
2 Claims. (Cl. 340—174)

The present invention relates generally to information storage and switching systems and is directed in particular to storage and switching systems which employ bistable magnetic storage elements.

Storage and logical switching systems employing bistable magnetic elements are well-known in the data processing arts. Of particular interest to this invention are those magnetic storage or switching systems which employ combinations of magnetomotive forces to drive the elements. Including among these are the well-known coincident-current magnetic core memory systems and core logical devices such as coincidence gates, coincident current switches and the like. These various systems and devices all depend for their operation upon the ability of a magnetic element to distinguish between magnetomotive forces greater than some threshold value and those below that value. This critical threshold value is commonly referred to as the "static" or "D.C." switching threshold of the element. In systems which employ conventional force summation techniques, a magnetic element is supplied with at least two input means each of which is adapted to supply force below the static threshold of the element. Selective alternation of the state of the element is achieved by simultaneous activation of several input means together, thus supplying a total force in excess of the static threshold of the element and producing the desired change of state.

Devices and systems which employ this principle of operation suffer the limitation that the individual driving forces must be kept below the switching threshold of the element and that the driving means must be closely controlled to insure coincidence of application. In low or moderate speed ranges this does not present a serious problem, but it does impose a limit to the operational speeds which can be obtained. This limit is well below the switching speed capabilities of the magnetic elements themselves.

Some increase in operation speed of magnetic devices of the type described has been achieved by the use of so-called "impulse switching" techniques according to which the magnetic elements are subjected to fields well above the static switching threshold but of very limited duration. It has been found that a driving force several times greater than the switching threshold of a magnetic element does not produce signficant irreversible flux switching if the duration of its application is below some critical time. Thus a second "dynamic" threshold, which is a function of the duration of the applied field as well as its amplitude, has been found to exist. This property is employed in magnetomotive force summation systems by using plural input means for an element, each of which input means is adapted to supply a force above the static switching threshold but short enough to fall below the dynamic threshold of the element. If the input means are activated individually no switching takes place. If, however, two or more inputs are supplied together, switching does occur. The inputs may be in exact coincidence so that the total force is above the dynamic threshold for the force duration used, or in partial coincidence so that a continuous force of more than the critical duration is exceeded. In either case rapid flux reversals are obtained.

This impulse switching technique offers speed improvement over conventional coincident-current techniques, but it is also subject to various disadvantages, one of the most serious of which is the timing tolerance requirement. Since the driving forces employed in this system are very narrow, the problem of matching two drive pulses to obtain at least partial coincidence is difficult in view of the various timing skews which exist in present day electronic equipment. In addition, since all input means supply forces in excess of the static switching threshold of the magnetic elements involved, serious disturbance of unselected elements by continued application of individual forces is possible, especially if the driving means are not perfectly controlled. In matrix storage systems such disturbances create a risk of destroying stored information.

The difficulties just discussed and other related problems are avoided in accordance with the present invention by the provision of a novel system for switching magnetic elements by combinational inputs which does not require time-coincidence of the inputs. This invention takes advantage of a novel "relaxation" phenomenon which has been observed to exist in bodies of certain bistable magnetic materials. It has been found with respect to magnetic cores of various bistable magnetic materials, including ferrites, that upon application thereto of a driving field in excess of the static switching threshold of the core, a transitory sensitized state is produced during which the switching threshold of the core is markedly reduced. This sensitized state exists for an appreciable time after termination of the sensitizing pulse. During the existence of the sensitized state application of a driving field below the static switching threshold of the core will cause irreversible flux switching. The sensitization is only temporary, however, and upon its termination, the switching threshold returns to its static value. A field less than the static threshold value applied after termination of the sensitized state has no effect upon the core.

The sensitizing pulse must be above the static threshold of the core to produce the sensitized state just described, and is preferably near or above the dynamic threshold. It has been found that an appreciable reduction in the switching threshold may be obtained by application of driving fields which do not themselves produce substantial irreversible switching. When fields much above the dynamic threshold are employed to produce the sensitized state, some irreversible flux switching takes place in addition to the sensitization and the element is left in a partially switched state after the sensitized condition disappears. In this situation the static switching threshold of the core does not return to its initial value but assumes a value representing the static threshold of a minor loop on which the magnetic state of the core resides. It is known that a magnetic core exhibits a family of hysteresis loops which include a major or limiting loop observed when the core is alternately set and reset to its limiting remanent states and a plurality of minor loops observed when the core is set and reset to remanent states less than the limiting states. The minor loops exhibit static switching thresholds lower than the static threshold of the major loop. A core which is fully switched, i.e., residing at remanence on the major loop, may therefore be expected to exhibit a higher switching threshold then it exhibits when in a partially switched state, i.e., residing at remanence on one of its minor loops. The relaxation effect just described should not be confused with this variation in threshold between hysteresis loops. The reduction in switching threshold observed when a core is placed in a partially switched state is a permanent reduction and does not disappear regardless of how long the core remains in the partially switched state. The threshold variation produced by the relaxation effect described above temporarily reduces the threshold of the material well below the static threshold value to which the core returns upon termination of the sensitized condition. In the case where the core is partially switched during sensitization, the threshold which the core exhibits during sensitization is well below the static threshold of the loop upon which the core resided before sensitization and also below the static threshold of the loop upon which it resides after the sensitized condition disappears.

This unique relaxation phenomenon, described more fully later herein, is employed in the present invention to accomplish combinational input switching of bistable magnetic elements by input drives which do not need to be in time-coincidence. According to one aspect of this invention, an element to be switched is subjected to a sensitizing pulse applied through one input means in such a way that it is placed in the sensitized condition wherein its switching threshold is reduced well below the static value. At some time during the period of sensitization, a drive pulse lower than the static threshold but above the "relaxed" threshold (the threshold existing during the sensitized state) is applied via another input means to drive the element to a new stable state, which may or may not be a limiting state. The new state is attained only if both the sensitizing and drive pulses are applied since neither input, acting alone, is sufficient to produce the change of state. The sensitizing pulse produces at most only a nominal change of flux and the drive pulse, applied without sensitization produces no change of flux since it is well below the normal threshold of the element.

According to another aspect of the invention an element is subjected to a sensitizing pulse which not only produces the relaxed condition described above, but also produces a substantial flux change in the element. At some time during the period of sensitization a drive pulse lower than the static threshold of the core is applied via a second input means to drive the element back toward the initial state. The new state is attained only if the sensitizing pulse is not followed by the driving pulse. The drive pulse thus effectively inhibits the sensitizing pulse, although it is not applied in coincidence therewith.

It will be appreciated by those skilled in the art that a core selection system employing switching techniques of the types just described enjoys significant advantages over prior art systems. For example, in a magnetic core matrix wherein individual cores are selected by combinational energization of coordinate excitation means, a selection system employing the present invention which does not require time-coincidence of the selected excitation means, avoids the problems encountered by the prior art in timing the excitations. In matrix memory systems, the selection system taught by this invention is particularly useful in that it permits time separation of the selecting excitations which designate the address selected in the matrix and those which designate the information to be entered at the selected address. The addressing means need not be held up until the information to be stored is presented, but may apply the addresss excitation prior of arrival of the information to be written and then go to the processing of a new address materially increasing the speed of the system. Advantages in simplification of address circuitry are also enjoyed since the write portion half of the address excitation may follow immediately behind the read portion without the presently required delay.

It is an object of the present invention to provide an improved system for switching a bistable magnetic element with combinational driving excitations.

More specifically it is an object of the invention to provide a novel combinational input switching system for magnetic elements which does not require time-coincidence of the input excitations.

It is an object of this invention to make use of the relaxation effect above described to permit time-separation of input excitations in a combinational input switching system for magnetic elements.

It is a further object of the invention to provide a magnetic core matrix memory system having enhanced operational speed and simplified operating controls.

It is also an object of this invention to provide a memory system which is less disturb sensitive than known systems of the same type.

The foregoing and other objects, features and advantages of the invention will be apparent from the following more particular description of preferred embodiments of the invention, as illustrated in the accompanying drawings.

Figure 3A:
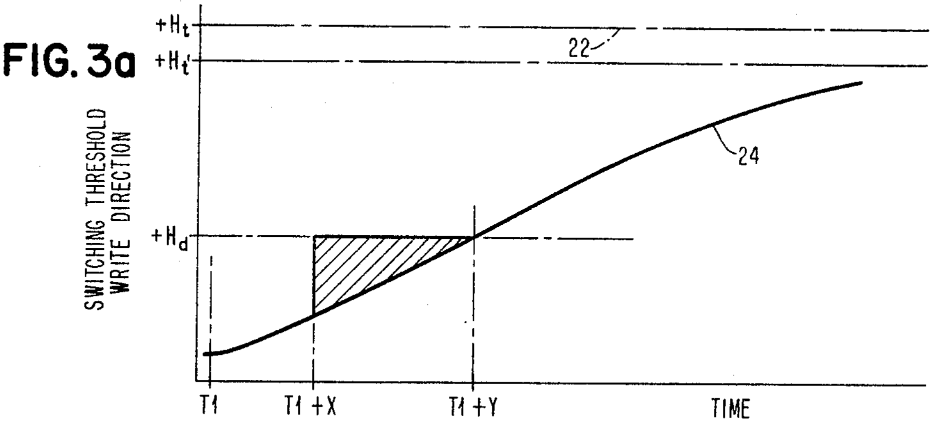
Figure 3B:
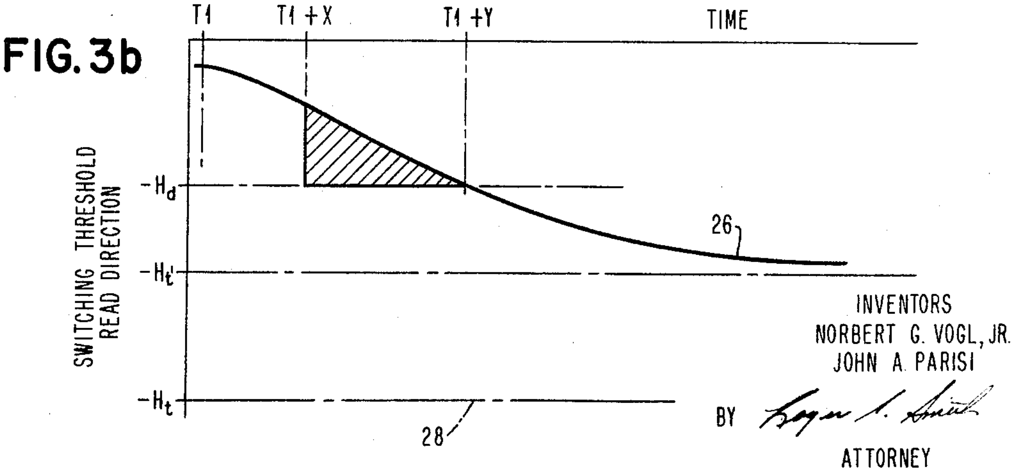
Figure 4A:
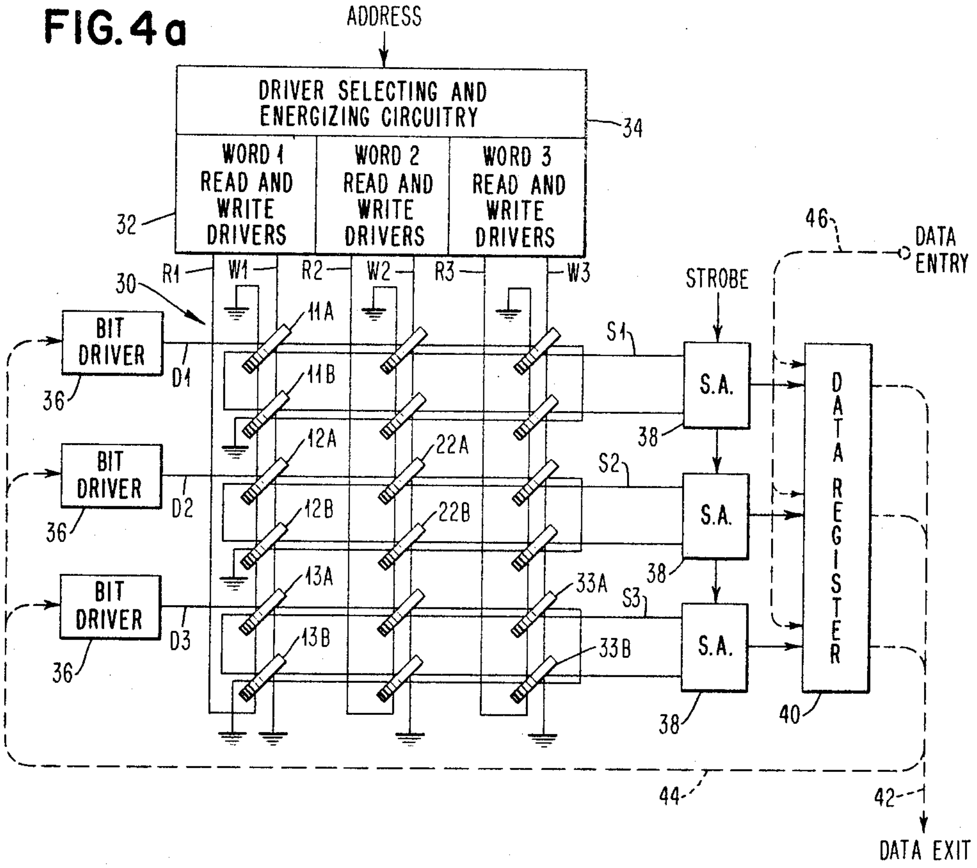
Figures 4B, 4C:
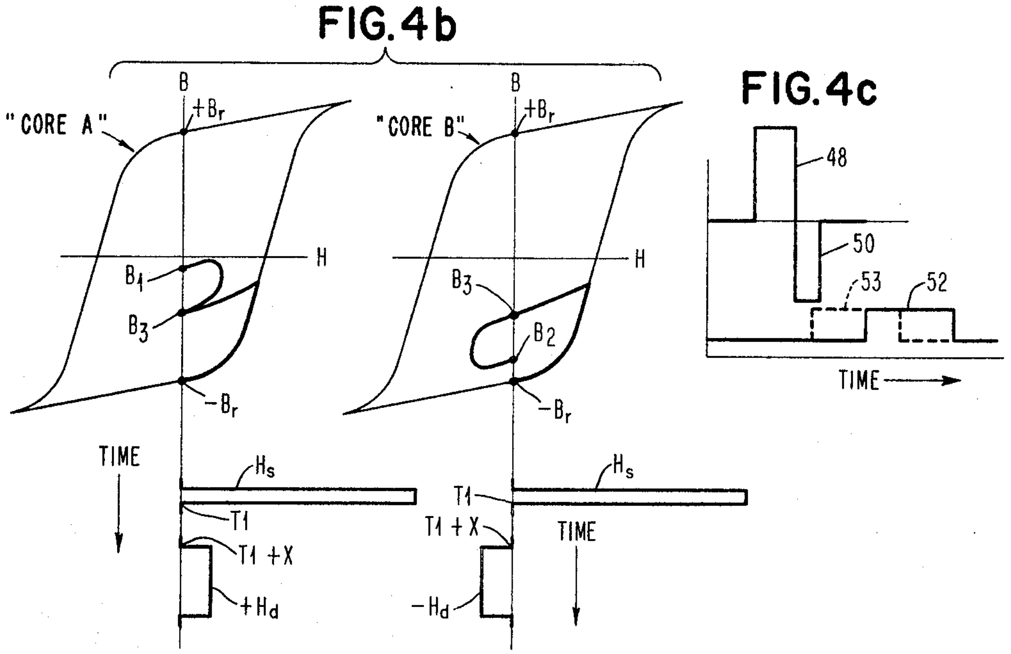
Figure 5A:
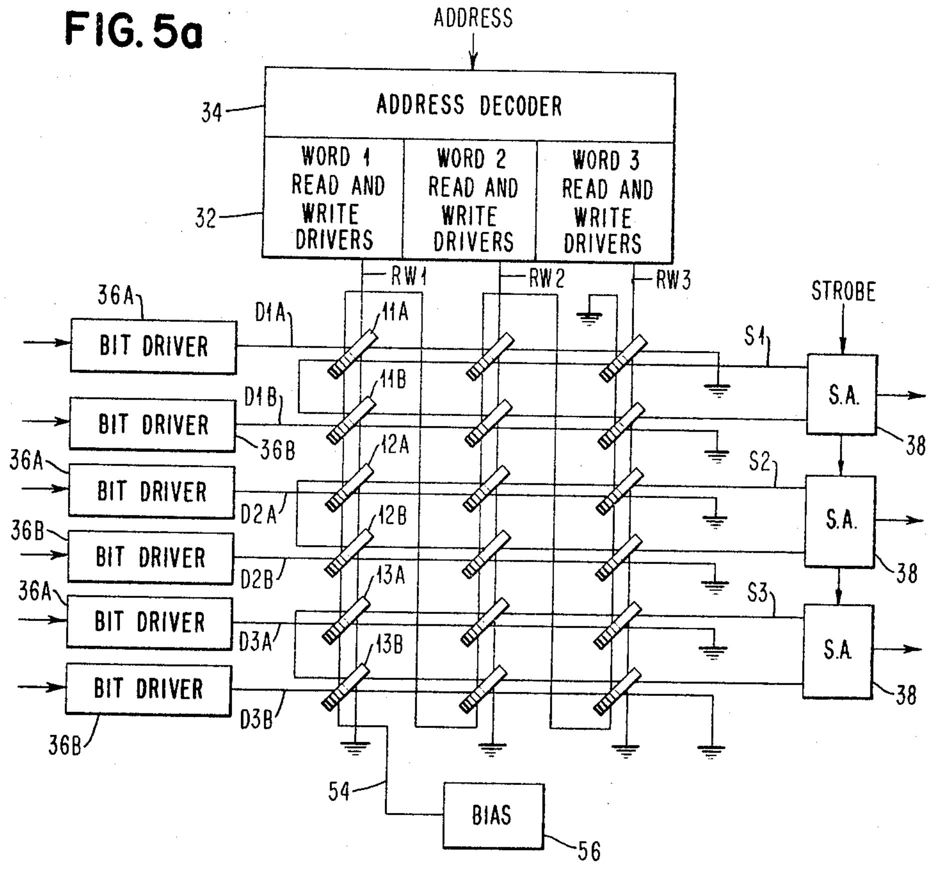
Figure 5B:
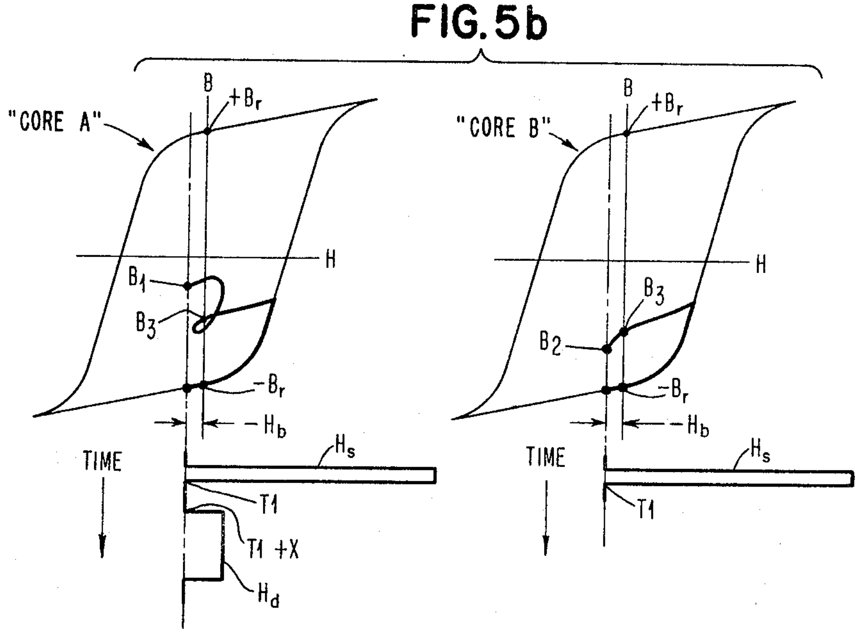

FIGS. 3*a* and 3*b* are graphs illustrating the relaxation phenomenon;

FIG. 4*a* is a schematic illustration of an improved memory system provided in accordance with this invention;

FIG. 4*b* is a hysteresis diagram illustrating the operation of the memory system of FIG. 4*a*;

FIG. 4*c* is a timing chart illustrating the scheduling of operating pulse for the system of FIG. 4*a*;

FIG. 5*a* is a schematic illustration of another memory system employing the present invention; and FIG. 5*b* is a hysteresis diagram illustrating the operation of the system of FIG. 5*a*.

As briefly mentioned earlier herein, the present invention takes advantage of a phenomenon termed a "relaxation effect." This effect has been observed to exist in various magnetic materials which exhibit appreciable remanence. The relaxation effect is observed to be quite pronounced in ferrite materials having low values of coercive force. Ferrites of the iron-manganese-zinc system are exemplary. The relaxation effect is manifested as a sharp reduction in the switching threshold of the material for a time following application of certain driving fields thereto. Before passing to a detailed description of this effect and the applications thereof, definitions of the various terms involved will be given.

The term "bistable magnetic element" or "bistable magnetic core" as employed herein refers to a body of magnetic material having substantial magnetic remanence, and adapted to be inductively coupled to suitable magnetomotive force supplying windings.

The term "switching threshold" refers to that value of magnetomotive force which must be exceeded before an appreciable change in remanent magnetism is produced. This is sometimes referred to in terms of field intensity and sometimes in terms of current intensity. It may be referred to hereinafter in either of these terms.

Two different thresholds are important to the present invention. The first of these is the "static" or "D.C." switching threshold which is defined as that value of magnetomotive force below which no appreciable irreversible switching occurs regardless of the time duration of the applied field. The other threshold is a function of the time duration of the applied field as well as its amplitude and is termed the "dynamic" threshold of the material. This property, which is known in the art, has been discussed earlier herein. It will be understood that while for a given magnetic element in a given state of remanence, there exists only one static threshold value, many dynamic thresholds exist, each of which is a function of the duration of the field involved.

In the following description, magnetic fields or the drive pulses which produce them will be referred to as being applied to a core in the "write" direction or the "read" direction. The "write" direction is the direction of a field which tends to switch the core toward the positive limiting remanence state, $+Br$ in the diagram of FIG. 2, and the read direction is the direction of a field which tends to switch the core toward the negative limiting remanence state, —B*r* in FIG. 2.

The relaxation effect is observed to exist in a bistable magnetic element following application of certain driving fields thereto. The effect is manifested as a transitory reduction in the switching thershold of the element, or stated somewhat differently, as a transitory sensitized condition of the element during which magnetomotive forces lower than the static threshold of the element are capable of producing appreciable irreversible flux changes. The mechanism which causes the effect is not fully understood. The sensitized condition is produced by applying to the element a magnetizing field greater than the static threshold of the element and in a direction to irreversibly switch flux in the element. This field will hereinafter be referred to as the "sensitizing" field.

Figure 2:
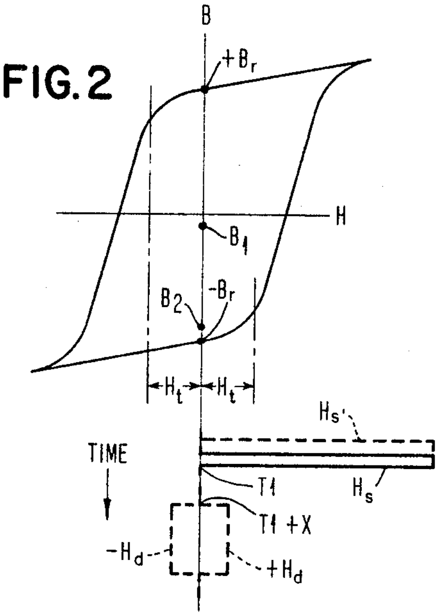
FIG. 2 is a hysteresis diagram illustrating the operation of the core of FIG. 1.

If the element is initially residing at one of its limiting remanence states, —B*r* or +B*r* on the hysteresis loop of FIG. 2, a sensitizing pulse applied in a direction to drive the core toward saturation in the same polarity does not produce any appreciable threshold reduction, since no irreversible switching is possible. To sensitize a core residing in either of these limiting remanence states, the pulse must be in a direction to tend to switch the core toward the opposite state. If, however, the core is initially residing in a partially switched state, for example, at point B1 in FIG. 2, a sensitizing pulse in either direction will produce a substantial threshold reduction.

The threshold reduction produced by sensitization occurs not only in the direction of the sensitizing pulse, but in the opposite direction as well. Thus if a sensitizing pulse is applied in the write direction to a core residing at, for example, point B1 in FIG. 2, the core will experience a relaxation of the switching threshold in the write direction and will also experience a relaxation of the switching threshold in the read direction.

The sensitizing field must be above the static threshold of the element and is preferably equal to or greater than the dynamic threshold. It has been found that the extent of sensitization of the element is in part a function of the amplitude and duration of the sensitizing field in that fields above the dynamic threshold of the element produce much deeper and more lasting sensitizations than do lesser fields.

It has been found that the extent and duration of the sensitization is in part a function of the magnetic state to which the core is driven by the sensitizing pulse. It apears that a core which is driven into saturation of either polarity by the sensitizing pulse does not experience as great a reduction in switching threshold as is produced if the switching is terminated before the core reaches saturation.

Figure 1:
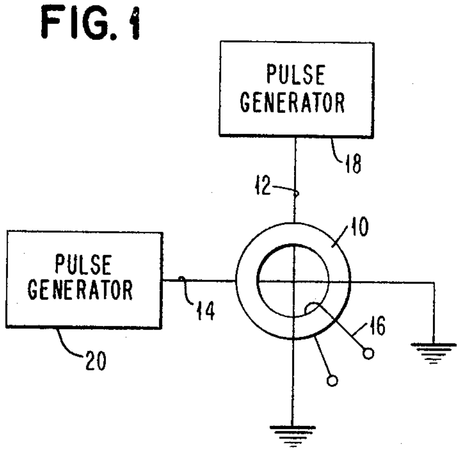
FIG. 1 is a schematic illustration of a magnetic core circuit arranged to be operated in accordance with this invention.

FIGS. 1, 2 and 3 of the drawings illustrate a bistable magnetic element adapted to be switched by combinational inputs making use of the relaxation effect, and the way in which it is operated. Referring to FIG. 1, there is shown a core 10 of bistable magnetic material exhibiting the relaxation effect described above. Input windings 12 and 14 and an output winding 16 are magnetically coupled to the core. The windings 12 and 14 are connected to pulse generators 18 and 20 respectively, which are adapted, when activated, to supply currents of predetermined magnitude and duration to their associated windings.

Let it be assumed that the core 10 is initially set at the negative limiting remanence state —B*r* of its hysteresis loop (shown in FIG. 2). To switch the core, a high amplitude, short duration sensitizing pulse is applied to winding 12 from generator 18 in the write direction. This pulse is adjusted to create a field H*s* in the core 10 which is well above the static threshold H*t* of the core but close enough to the dynamic threshold to produce only a nominal irreversible flux change. The graph of FIG. 3*a* illustrates the relaxation effect in the write direction produced by the pulse on winding 12. The vertical axis of the graph represents the switching threshold of the core in the write direction and the horizontal axis represents time. The line 22 represents the static threshold of the core when residing at —B*r*. The line 24 represents the actual threshold. Time T1 on the graph indicates the point of termination of the field H*s*. It will be noted that at this time, the actual threshold of the core is reduced to a value which is a minor fraction of the static value. As time passes, the threshold increases (along the line 24 toward the right) until it eventually attains a steady state value +H*t'* near the original value indicated by line 22. Since the sensitizing pulse actually caused some irreversible switching and, therefore, left the core on one of its minor loops, the new static threshold value is somewhat less than the original value.

At some time $T1+x$ the pulse generator 20 is activated to supply a low amplitude, long duration current pulse to winding 14 in the write direction. The amplitude of this pulse is adjusted to create a field +H*d* lower than the static threshold H*t* but greater than the relaxed value.

It will be seen from the shaded area of FIG. 3*a* that due to the sensitized condition of the core, the field +H*d* is, at least during the period $T1+x$ to $T1+y$, greater than the actual threshold of the core, so that it produces a substantial irreversible flux change, switching the core to, for example, point B1.

It will be appreciated that had the core 10 been subjected only to field H*s* it would have been only slightly disturbed, for example from —B*r* to B2. Had the core been subjected only to field H*d* without sensitization it would not have been disturbed at all. The sequential application of fields H*s* and H*d*, therefore, produced a unique change of state not possible with either acting alone. By subsequently driving the core back to —B*r* and examining the output voltage induced in winding 16, the state to which it was driven by the input combination may be detected.

It is important to note that in the example just described, the two inputs which produced the unique flux change were not applied coincidently or in immediate succession, but were separated by a time *x* during which no field was applied to the core.

As mentioned earlier herein, the threshold reduction produced by the relaxation effect exists in both the read and the write directions. It is possible, therefore, to operate the core 10 with counteracting excitations as well as with aiding excitations as in the example just described. In the case where counteracting excitations are employed, the sensitizing pulse is employed to switch the core from a reset state to an information representing state. The subsequent drive pulse is employed to effectively inhibit the change of state produced by the sensitizing pulse. To understand this mode of operation, let it again be assumed that the core 10 of FIG. 1 is initially reset to the state —B*r*. By activation of generator 18, a sensitizing pulse in the switching direction is applied to winding 12. In this example, the sensitizing pulse is adjusted to produce a field H*s'* of sufficient magnitude and duration to switch the core to point B1. At the end of the sensitizing pulse, the core exhibits a greatly reduced switching threshold in both the read and the write direction.

The graph of FIG. 3*b* illustrates the variation of the switching threshold in the read direction. As in FIG. 3*a*, the vertical axis represents threshold field and the horizontal axis represents time. The line 26 illustrates the actual read threshold variation. It will be seen that at T1 when the sensitizing pulse has terminated, the threshold is at an extremely low level. As time passes the threshold increases until it eventually reaches a static value —H*t'*. This value represents the static threshold of the core in the read direction when it is residing at point B1 on one of its minor loops. The value —H*t'* will be found to be somewhat lower than the static read threshold $-Ht$ of the core when at point $+Br$. The value $-Ht$ is indicated at 28 in FIG. 3*b*.

At a time $T1+x$ following the switching and sensitization of the core 10 the generator 20 is activated to apply a low amplitude current pulse to winding 14 in the read direction. This pulse is adjusted to produce a field $-Hd$ which is less than the static threshold of the core 10 residing at point B1 but greater than the sensitized threshold, as shown by FIG. 3*b*. During the time that field $-Hd$ exceeds the actual threshold of the core, indicated by the shaded area of FIG. 3*b*, flux will be switched in the read direction and the core will be driven back toward $-Br$, for example, to the point B2. The low amplitude drive pulse has thus effectively inhibited the effect of the sensitizing pulse on core 10 even through it was applied a time $x$ after termination of the sensitizing pulse.

To aid in understanding and practicing the present invention, and to facilitate an appreciation of the results obtainable therewith, the specific details of a typical combinational input switching operation upon a sample core are given below. It should be understood that these figures are exemplary only, and are not intended to limit the invention. The sensitizing and driving pulse values selected and their relative timing for any specific embodiment of the invention will depend upon the characteristics of the magnetic core employed and the amount of flux change desired.

In the operation to be described, a bistable magnetic core of the manganese ferrite system was employed. The core was found to have a static switching threshold of about 100 milliampere turns. The core was initially placed at its negative limiting remanence point $-Br$ and a sensitizing pulse of 500 milliampere turns and 30 nanoseconds duration was applied in a direction to switch the core to $+Br$. The sensitizing pulse was found to switch from 5% to 10% of the flux in the core when applied alone. A drive pulse of 40 milliampere turns and 200 nanoseconds duration, also in the positive direction, applied 100 nanoseconds after termination of the sensitizing pulse was found to switch an additional 10% to 15% of the flux in the core. The same drive pulse applied 1 microsecond after sensitization had no effect upon the core.

Referring now to FIGS. 4*a*, 4*b* and 4*c* of the drawings, there is shown in FIG. 4*a* a two-core-per-bit memory system which embodies the present invention. This system is of the same general type as that disclosed in the copending application Ser. No. 115,741, now Patent No. 3,191,163, filed June 8, 1961, by David J. Crawford and assigned to the assignee hereof. The system includes a word organized matrix 30 of bistable magnetic cores exhibiting the relaxation effect. These cores have about the same hysteresis characteristics as the core 10; that is to say, they exhibit appreciable remanence but are not necessarily of the square hysteresis loop type. The matrix 30 consists of three columns, each comprising a different word storage register 1, 2 or 3 and three pairs of rows, each pair representing a different bit position 1, 2 or 3 common to all registers. Separate word write-in windings W1, W2 and W3 couple all of the cores in each column in one sense. Separate word read-out windings R1, R2 and R3 also couple all of the cores of each column but in the opposite sense. Separate bit or digit selecting windings D1, D2 and D3 couple all of the cores in each pair of rows, the sense of coupling with the cores of the upper row of the pair being opposite to the sense of coupling with the lower row. Sense windings S1, S2 and S3 are provided for the row pairs in the same manner as the bit windings as shown in FIG. 4*a*.

A bit storage cell in the matrix 30 consists of the two magnetic cores common to one word winding and one bit winding. These two cores are referred to as the A core and the B core of the cell. In FIG. 4*a* the cores are identified by the reference characters 11A, 11B . . . 33A,

33B. The first digit of the reference character identifies the word register to which the core corresponds, the second digit identifies the bit position, and the alphabetic character indicates the position within the cell.

A binary value is entered in a storage cell of the matrix 30 by driving the two cores thereof from an initial reset state toward the opposite state in such a way that one core switches farther from the reset state than the other. The value entered depends upon which core is driven farthest. Stored information is retrieved by driving both cores of the cell back to the reset state and differencing the output signals which they produce. The polarity of the net difference signal indicates the binary value stored. It will be apparent that the arrangement of the sense windings S1–S3 provides this differencing function between the outputs of the A and B cores of a cell, since the cores are coupled to their associated sense winding in opposition.

The word selecting windings R1–R3 and W1–W3 are coupled to read and write drivers generally indicated at 32, provided for each word storage register. These drivers are controlled by driver selecting and energizing circuitry 34 which is effective to select and energize the drivers of selected word registers in response to address information supplied from some external source. The circuitry 34 includes timing means for controlling the sequence and duration of read and write pulses supplied by the driver means 32. The means 32 and 34 are not disclosed in detail herein since they are known in the art. For example, the copending application Ser. No. 115,741, now Patent No. 3,191,163, mentioned above, discloses decoding, timing and driving circuitry which may be employed as the means 32 and 34.

Each of the bit windings D1–D3 is coupled to a bit driver 36 which may be any pulse generator capable of supplying current pulses of either polarity in response to information representing inputs supplied thereto. These drivers are arranged so that information signals representative of binary ones will activate them to produce positive outputs while inputs representing binary zeros will cause them to produce negative outputs. The dashed arrows at the left of the drivers in FIG. 4*a*, indicate the information input means. The actual input circuitry and the details of the drivers 36 are not disclosed herein since they are not necessary to an understanding of the invention. Bipolar bit drivers of the same type and the means for operating them are shown in the copending application mentioned earlier herein.

The sense windings S1–S3 of the matrix 30 are coupled to sense amplifiers 38 of the type capable of amplifying signals of either polarity and producing outputs indicative of the polarity of the input signals. The amplifiers 38 are connected to a data register 40 in which data read from the memory matrix 30 is stored pending submission to a utilization device via the data exit path shown symbolically at 42, or pending regeneration in the memory via the regeneration loop shown symbolically at 44.

It is conventional in magnetic core storage systems to employ the data register 40 for entry information into the memory as well as for read out. New data to be entered in memory is entered via a data entry path 46 into the register 40 and thence, via the regeneration loop 44 to the bit drivers. It is not believed necessary to show the details of the data exit, regeneration and entry paths 42, 44 and 46 since the circuitry involved therein is old and well known in the magnetic core memory art.

In the operation of a memory system such as that shown in FIG. 4*a*, a word of information stored in a selected word register is first read out to the data register and a word of binary information is then written into the same selected word register during each cycle of operation. If the purpose of the memory cycle is to "fetch" information from the selected word register, the information read from memory into the data register during the read half of the cycle is sent out via the exit path 42 and also sent back to the memory matrix via the regeneration path 44 and rewritten in its original location during the write half of the cycle. If the purpose of the cycle is to "store" information in the selected word register, the information read therefrom during the read portion of the cycle is cast out, for example, by maintaining the sense amplifiers 38 in a disabled condition during the read-out period, and the data register is set with information supplied via the data entry path 46. This new information is sent along the regeneration path and written into the selected location during the write half of the cycle.

In each of the cases mentioned above, information residing in the data register at the end of the read part of the cycle must be sent along the regeneration path 44 to the bit drivers 36 before it can be written into the memory. An appreciable amount of time is involved in setting the data register 40, conveying outputs therefrom to the drivers 36 and activating those drivers. In conventional systems, which depend upon the coincidence of current pulses on the word write-in winding and bit windings of the storage register to be filled, a waiting period must be included between the read and write portions of the memory cycle, during which the driver selecting and energizing circuitry 34 must hold the address of the storage register just read out, so that it can energize the proper driver to apply current to the write-in winding of the same word register. By employing the switching techniques described hereinbefore, this waiting time may be eliminated, to free the circuitry 34 at an earlier time for processing new address information, and to permit higher operation speeds.

It is believed that the memory system of FIG. 4*a* may best be understood by considering an example of its operation. Let it be assumed that the word register 1 contains the binary word "101" and that it is desired to read this word out and re-write it in the same register. In a two-core-per-bit system of the type shown, each of the binary bits of this word is stored as a predetermined combination of states of the A and B cores of a different cell of the word 1 register of matrix 30. Referring to FIG. 4*b*, which shows the hysteresis loops of the A and B cores of a typical cell, a one is stored when the A core resides at remanence points B1 and the B core resides at remanence point B2. A zero is stored when the states of the cores are reversed.

To read out word register 1, the circuitry 34 is caused, by application thereto of the address of word register 1, to activate the read driver associated with winding R1. Winding R1 is supplied with a current pulse which creates a field in the read direction in all cores 11A, 11B, 12A, 12B, 13A and 13B sufficient to drive each core to $-Br$. Since the cell 11A, 11B and the cell 13A, 13B each contained a one, the A cores of these cells produce larger outputs than the B cores in the sense windings S1 and S3, and present net difference signals of one polarity, say positive, to the first and third amplifiers 38. Binary ones are entered in the corresponding positions of the register 40. The cell 12A, 12B contained a zero and induces a net difference signal of negative polarity in winding S2, causing the corresponding position of register 40 to record a binary zero.

Immediately upon completion of the read drive pulse in winding R1, and while the signals read from word register 1 are being processed by the sense amplifiers 38 and data register 40, the circuitry 34 causes the write driver 32 of word register 1 to apply a current pulse, indicated at 50 in FIG. 4*c* to winding W1. This pulse is adjusted to create a field $Hc$ in the associated cores 11A–13B in the write direction much higher than the static threshold of the cores but short enough to produce only a partial change of state. This pulse, which will be recognized as the sensitizing pulse, drives all of the cores of word register 1 to a point B3 (see FIG. 4*b*) on their hysteris loops, and places each core in the transitory sensitized state described hereinbefore. At the time this sensitization is taking place (during the period which is normally reserved as waiting time in conventional systems), the information which is to be rewritten in register 1 is still being handled by the data register 40 and regeneration circuitry 44 and may not be available at the bit drivers. Notwithstanding this, once the cores of register 1 have been sensitized, the address of register 1 may be cleared from the circuitry 34 and it may progress to the processing of new address information for the next memory cycle.

As described earlier, the sensitized state in which the cores of register 1 are placed exists for an appreciable time following the write pulse. During this period, the information en route from the data register 40 reaches the bit drivers 36 and they are actuated to complete the write-in operation. The drivers 36 associated with windings D1 and D3 are activated in a direction to pass current through these windings toward ground to create fields $+Hd$ in cores 11A and 13A in the write direction, and fields $-Hd$ in the read direction in cores 11B and 13B. Driver 36 associated with winding D2 is activated in the opposite sense to pass current from ground to create a field $-Hd$ in core 12A and a field $+Hd$ in core 12B. The current pulses generated by these drivers 36 shown at 52 in FIG. 4*c* are adjusted so that the fields $\pm Hd$ are well below the static threshold of cores in any of the states B1 or B2 so that no disturbance of information stored in cores of storage registers 2 or 3 is effected. Because of the reduced thresholds of the sensitized cores of register 1, however, these fields $\pm Hd$ can and do produce substantial flux switching. The cores 11A, 12B and 13A, which secure $+Hd$ are caused to switch from B3 up to B1 as shown on the loop A of FIG. 4*b*. The cores 11B, 12A and 13B which receive $-Hd$ are caused to switch down from B3 to B2 as shown on loop B of FIG. 4*b*. It will be apparent that following activation the bit drivers 36, each cell of register 1 is in the condition in which it resided prior to read-out.

The precise time at which the bit drivers 36 are activated in the write half is not critical so long as they are activated within the period of sensitization. Early application of the bit current, as indicated at 53 in FIG. 4*c*, has no adverse effect, but rather increases the amount of flux switched by the fields $\pm Hd$, and, hence, increases the difference between the states of the two cores in each cell. Wide tolerances in application of the bit drivers are thus permitted in this system as contrasted to the close tolerances which must be maintained in conventional coincident-current systems.

Inasmuch as the write drive on the word selection windings may follow immediately behind the read drive in the present system, as shown in FIG. 4*c*, it is possible to provide simplified word drivers and energizing circuits for the memory. For example, since no time delay is involved in the application of the write drive following the read drive, drivers which automatically provide first a pulse of one polarity and then a pulse of the opposite polarity in response to a single input signal may be employed. Controlled recovery diodes having the property of permitting reverse conduction for a limited time following conduction in the forward direction may be employed in the read-write driver circuits to provide both read and write drive pulses in response to a single address selection signal.

When circuits of the type just discussed are employed, or for that matter, whenever bipolar read-write drivers are employed, it is not necessary to provide separate read and write selection windings R and W in the word selecting dimension. A single column winding adapted to carry both the read and write currents may be employed.

In the system of FIG. 4*a* a bipolar bit driver and a single bit winding are provided for both the A and B rows of cores of each bit position in the matrix. Two-core-per bit systems employing two unipolar bit drivers and a separate bit winding for each of the A and B rows of cores are also known in the art. Such a system is shown in FIGS. 5*a* and 5*b* of the drawings. The system of FIG. 5*a* is identical to that of FIG. 4*a* with the exceptions noted below and the reference characters of FIG. 4*a* are used in FIG. 5*a* to indicate similar elements. In this system, however, separate bit entry windings D1A, D1B, D2A, D2B, D3A, and D3B are provided, each coupling all of the cores of a single row in the same sense. Each bit winding is connected to unipolar bit driver 36A or 36B which is adapted to supply current in the write direction of magnitude and duration sufficient to create the field +H*d* shown in FIG. 5*b*. As in the system of FIG. 4*a* this field is below the static thresholds of the matrix cores in any of their information states. The system of FIG. 5*a* also differs from that of FIG. 4*a* in that common read-write windings RW1–RW3 are employed in the word selection circuits.

Read-out and write-sensitization of the cores of a selected register are accomplished in the manner described in connection with FIG. 4*a*. Entry of information during the sensitized period is accomplished by activating either the A or B bit driver of each bit position in accordance with the information supplied to the bit drivers. If the driver for the A row is energized to store a binary one the A core of the sensitized cell is switched by the low amplitude bit current while the B core is allowed to remain in the state to which the sensitizing pulse set it. If a zero is to be entered, the driver for the B row is energized to drive the B core of the sensitized cell.

In this system, smaller difference signals may be expected upon read-out since no counteracting drive is applied to the core in each cell which is to reside in the lower state.

It has been found that more reliable operation may be attained in the system of FIG. 5*a* if means are provided to switch all sensitized cores a short distance toward −B*r* during the write-in operation. While this does not necessarily change the amount of difference between the states of the two cores in a cell, it does improve the ratio of their outputs upon readout. For example, assuming that a 10% difference in flux levels may be obtained by driving one core with the bit drive during sensitization, a higher ratio between the outputs of the two cores exists if the flux levels in the cores are in states 15% and 5%, respectively, above −B*r* than if they are 25% and 15%. In the first case the ratio 2 to 1 whereas in the second case it is only 1.67 to 1.

The means for switching the cores toward −B*r* consists of a bias winding 54 threaded in the same direction through all of the cores of the matrix and coupled to a D.C. bias source 56. The winding 54 carries a D.C. current through all cores sufficient to maintain a small bias field −H*b* (see FIG. 5*b*) in the read direction in all cores. This bias field is below the static thresholds of the cores in their various information holding states so that it does not disturb unsensitized cores. It is large enough, however, to exceed the relaxed read threshold of a sensitized core.

The effect of the bias is shown in FIG. 5*b*, which illustrates the hysteresis loops of the A and B cores of a typical cell of FIG. 5*a*, for example, cell 11A, 11B. Let it be assumed that the cores of the cell have been read out and that a binary one is to be written therein. The cores are sensitized as previously described by the field H*s* applied via the word winding RW1 of the cell. This field sensitizes the cores of register 1 and also switches them to point B3. Upon sensitization, the read bias −H*b* applied via winding 54 is able to switch both cores 11A and 11B back toward −B*r* a short distance. In core 11A, however, the bit field +H*d* overcomes the bias and switches the core up to point B1. The field +H*d* must exceed the bias field but still remain below the static threshold of the cores of the matrix in their various information representing states. The core 11B does not receive the bit field and is carried downwardly by the bias until its threshold recovers sufficiently to prevent further switching. It comes to rest at point B2.

It will be apparent that the bias arrangement of FIG. 5*a* is also applicable to the system of FIG. 4*a*.

In the foregoing description, the invention has been shown as applied to systems which employ two cores for storage of each bit of information. It will be apparent to those skilled in the art, however, that the invention is equally applicable to one-core-per-bit systems. If in the system of FIG. 4*a*, for example, the B rows of cores are removed, together with the portions of windings D1–D3 which couple the B rows, and if the sense amplifiers are modified to descriminate between outputs induced by resetting cores in state B1 of FIG. 4*b* and those induced by resetting cores in state B2, then this system may be as a one-core-per bit memory. The operation of the memory may be idenfical to that described with reference to FIG. 4*a*. A binary one is stored by driving a sensitized core from B3 to B1 with a field +H*d* while a binary zero is stored by driving a sensitized core from B3 to B2 with a field −H*d*.

Similar modification may be made of the system of FIG. 5*a* to provide a one-core-per-bit system using unipolar bit drives rather than a bipolar bit drive. In FIG. 5*a*, the B rows of cores, their bit windings D1B, D2B and D3B, and the drivers 36B may all be removed. As in the example described immediately above, the sense amplifiers may be modified to perform amplitude discrimination between outputs induced by cores reset from state B1 of FIG. 5*b* (which may represent a stored binary one) and those induced by cores reset from state B2 (which may represent a stored binary zero).

Either of the one-core-per-bit systems may use the bias arrangement of FIG. 5*a* or may be operated without it.

While the invention has been particularly shown and described with reference to preferred embodiments thereof, it will be understood by those skilled in the art that various changes in form and details may be made therein without departing from the spirit and scope of the invention.

What is claimed is:

1. A combinational input switching circuit comprising:

(a) a bistable magnetic core having two limiting remanence states and a plurality of intermediate remanence states and having a static switching threshold associated with each said remanence state which must be exceeded by a magnetizing field before the core can be switched from the said state, said core having the characteristic that a sensitizing field sufficient in magnitude to drive the core from an occupied remanence state but not necessarily sufficient in duration to produce a substantial change of state produces a transistory sensitized condition which exists for a finite time after termination of the sensitizing field and during which the switching threshold is reduced to a minor fraction of the static value to which it returns upon termination of the sensitized condition;

(b) sensitizing means for applying a sensitizing field to said core which is larger in magnitude than the static switching threshold to produce the transitory sensitized condition and to drive the core in a first direction to a new remanence state; and (c) means effective during existence of said sensitized condition for applying to the core, non-coincidentally with said sensitizing field, a magnetizing field which is opposite in polarity to the sensitizing field and is of a magnitude less than the static switching threshold value to which the core would return upon termination of said sensitized condition but greater than the reduced threshold in existence at the time of application of the pulse so as to drive the core in a direction opposite to said first direction back towards the core's original remanence state.

2. A combinational input switching circuit comprising:

(a) a bistable magnetic core having two limiting remanence states and a plurality of intermediate remanence states and having a static switching threshold associated with each said remanence state which must be exceeded by a magnetizing field before the core can be switched from the said state, said core having the characteristic that a sensitizing field sufficient in magnitude to drive the core from an occupied remanence state but not necessarily sufficient in duration to produce a substantial change of state produces a transitory sensitized condition which exists for a finite time after termination of the sensitizing field and during which the switching threshold is reduced to a minor fraction of the static value to which it returns upon termination of the sensitized condition;

(b) sensitizing means for applying a sensitizing field to said core which is larger in magnitude than the static switching threshold but insufficient to produce a substantial change of state so as to produce the transitory sensitized condition without producing a substantial change of state; and (c) means operable during existence of said sensitized condition for applying, only after the termination of said sensitizing field and only after the termination of a discrete time period following the termination of said sensitizing field a magnetizing field to the core of magnitude less than the static switching threshold value to which the core would return upon termination of said sensitized condition but greater than the reduced threshold in existence at the time of the application of the pulse to drive the core to a new remanence state.

References Cited by the Examiner

UNITED STATES PATENTS 3,023,402 2/1962 Bittman ------------ 340—174

BERNARD KONICK, *Primary Examiner.*

IRVING L. SRAGOW, *Examiner.*

M. S. GITTES, R. R. HUBBARD, *Assistant Examiners.*